United States Patent [19]

Biller

[11] 4,310,194
[45] Jan. 12, 1982

[54] TENT CAMPER FOR PICKUP TRUCK

[76] Inventor: Joseph A. Biller, 810 Lexington, El Cerrito, Calif. 94530

[21] Appl. No.: 180,736

[22] Filed: Aug. 25, 1980

[51] Int. Cl.³ .............................................. B60P 3/32
[52] U.S. Cl. ...................................... 296/159; 296/26; 296/27; 296/100; 296/107; 135/4 A
[58] Field of Search .................. 296/159, 161, 27, 26, 296/100, 107; 135/1 A, 3 A, 4 A

[56] References Cited

U.S. PATENT DOCUMENTS

| | | | |
|---|---|---|---|
| 3,445,134 | 5/1969 | Pair | 296/27 |
| 3,456,978 | 7/1969 | Daniels | 296/27 |
| 3,688,787 | 9/1972 | Feather | 296/100 X |
| 3,737,190 | 6/1973 | Smith | 296/159 |
| 3,773,379 | 11/1973 | Loiseau | 296/107 |

Primary Examiner—Robert R. Song
Attorney, Agent, or Firm—Townsend & Townsend

[57] ABSTRACT

A tent camper for mounting over the cargo compartment of a pickup trust is disclosed. The tent camper includes a collapsible frame and a cloth top stretched over the frame. The frame includes inverted U-shaped fore and aft supports pivotally mounted to the sidewalls of the cargo compartment of the pickup. The cloth top, having a generally rectangular top and four depending sides, is sized to extend over the floor of the cargo compartment and the lowered tailgate. The lower edges of the depending sides are attached to the outside edges of the sidewalls and the lowered tailgate by snaps. The fore and aft supports are pulled foward and rearward by straps so that the fore and aft supports are forced away from one another thus keeping the fabric taut and properly positioned over the pickup truck.

10 Claims, 2 Drawing Figures

TENT CAMPER FOR PICKUP TRUCK

BACKGROUND OF THE INVENTION

Pickup trucks are often temporarily converted for use as a recreational vehicle. The most common way of doing this is by mounting a camper to the cargo compartment of the pickup truck. Although these rigid camper bodies have distinct advantages, they are very heavy and relatively expensive. Their weight and height drastically reduce the mileage the user realizes when driving and also make their removal and storage quite difficult.

In order to reduce the weight and cost associated with rigid camper bodies, various types of supported cloth covers for the cargo compartment of pickup trucks have been developed. Many of these covers are intended not for human habitation, but merely to cover the cargo area. Therefore, the supporting frame structures of these cargo covers are often not particularly suitable for supporting the much higher cover required when used as a shelter for people.

The prior art cloth covers which have been developed as temporary dwellings, called tent campers, have failed to appreciate and take advantage of the added floor space available when the tailgate is in its lowered or horizontal position. Further, the prior art cargo covers and tent campers often require the user to set or adjust the internal supports from positions from within the cargo compartment. Erection of these coverings can be quite awkward and frustrating.

SUMMARY OF THE INVENTION

A tent camper for mounting over the cargo compartment of a pickup truck is disclosed. Generally, the tent camper includes a collapsible frame pivotally mounted to the sidewalls of the cargo compartment and a cloth top stretched over the frame. The frame includes an inverted U-shaped fore support pivotally mounted to the sidewalls of the cargo compartment adjacent to cab and an inverted U-shaped aft support pivotally mounted to the sidewalls near the tailgate.

The cloth top, preferably a waterproof fabric such as canvas, has a generally rectangular top and four depending sides. The top is sized to extend over the floor of the cargo compartment and also over the tailgate when it is in a lowered or horizontal position. The fore support is pulled forward by a pair of straps so that the central portion of the U-shaped fore support lies generally above the front or forward portion of the cargo compartment. A pair of aft straps pull the aft support pivotally rearwardly. The aft straps typically hook over the outer edge of the lowered tailgate. Thus, the fore and aft supports are forced away from one another by the respective straps to keep the fabric taut and properly positioned over the cargo compartment and lowered tailgate of the pickup truck.

An inverted U-shaped center support pivotally attached at its free ends to the aft support is also used to provide vertical support for the center of the top of the cover. The lower edges of the depending sides of the cover are attached to the outside edges of the sidewalls of the cargo compartment and the lowered tailgate, typically by snaps. A zippered opening or flap is provided in the side extending to the lowered tailgate for access to the interior of the tent camper.

The tent camper of the present invention fully uses the available space provided by the floor of the cargo compartment as well as the extra space provided by the lowered tailgate since the top extends fully over the floor and the lowered tailgate.

Generally, the cloth cover is supported by the U-shaped supports of the pivotally mounted frame. Several significant features combine to keep the frame erect and the fabric tautly stretched over the frame. The fore and aft straps urge the fore and aft supports both upwardly and outwardly away from each other to stretch the top of the cover between them. The upward and outward pivoting of the supports is resisted by both the box-like configuration of the cover and by snaps joining the lower edges of the depending sides to the outer edges of the sidewalls. The fore and aft supports stretch the top between them and pull up on the depending sides.

In the event that the depending sides of the cover should shrink or stretch, the user can change the heights of the fore and aft supports to compensate for any change in dimension. Also, any change in length of the top of the cover is automatically compensated for by the outward pull of the fore and aft supports. Therefore, regardless of any stretching or shrinkage which may occur in the fabric, the cover will always be tautly stretched over the supports of the frame. Keeping the fabric relatively taut is important for both aesthetic reasons and for maximum protection against leaks.

Because there are no internal support rods which must be put into place when erecting the tent camper, the erection of the tent camper can proceed simply by a single person from the outside of the cargo compartment. Groping in the dark under a mound of collapsed canvas is avoided.

The tent camper of present invention provides an enclosed living area typically high enough for the user to stand up therein while allowing the cover and frame to be folded down within the cargo compartment while traveling or when otherwise not needed. Since the tent camper is light in weight and folds down and out of the way while traveling, its effect on fuel consumption is negligable.

Additional features and advantages of the invention will appear from the following description in which the preferred embodiment has been set forth in detail in conjunction with the accompanying drawings.

DETAILED DESCRIPTION OF THE PREFERRED EMBODIMENT

Figure 1:
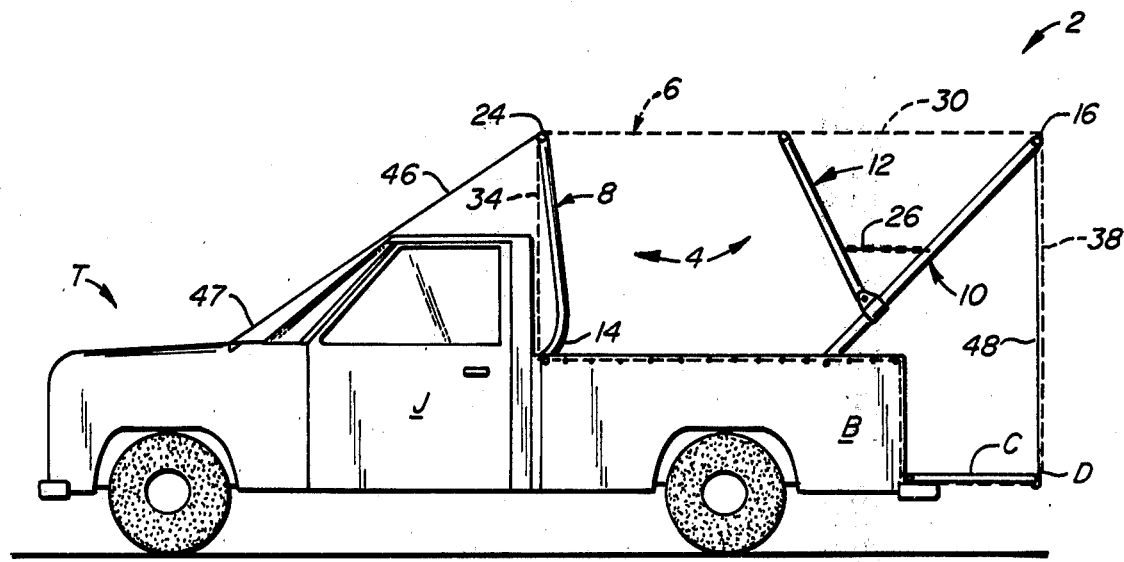
FIG. 1 is a side view of the frame of the invention shown mounted to the cargo compartment of a pickup truck with the outline of the cover shown in dotted lines.
Figure 2:
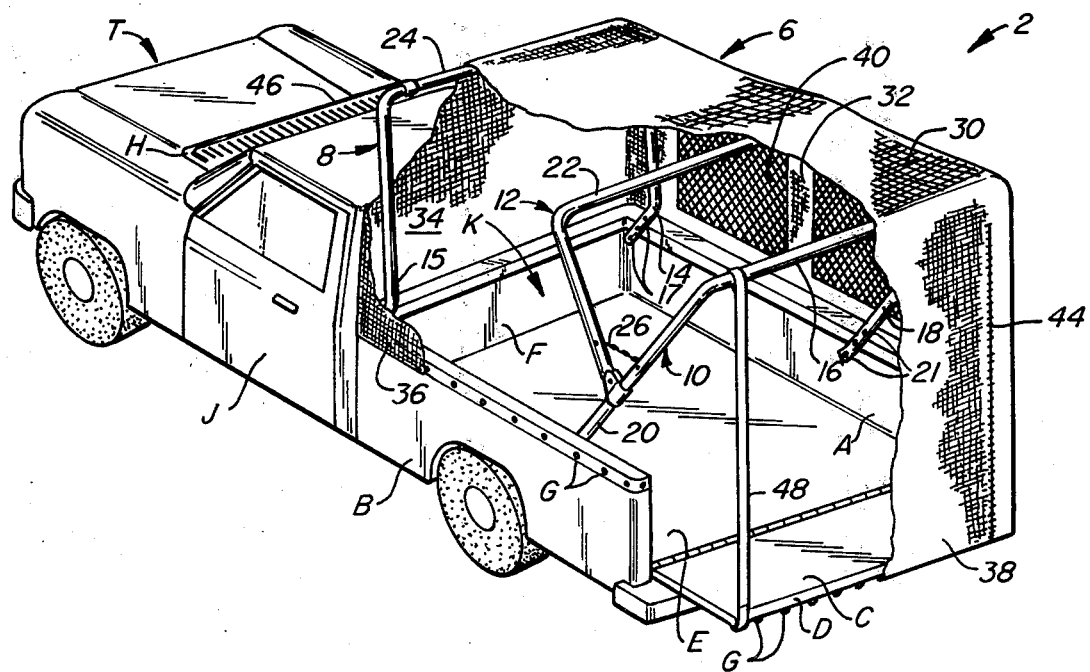
FIG. 2 is a perspective view of the invention mounted to a pickup truck with portions of the cloth cover broken away to show detail.

Turning now to the figures, the tent camper of the present invention 2 comprises generally a frame 4 and a cover 6. The frame is preferably of tubular construction; the cover can be any suitable water repellent shelter fabric, such as canvas or nylon.

The frame includes a fore support 8, an aft support 10, and a center support 12. Fore support 8 is an inverted U-shaped tubular member pivotally mounted at its lower ends 14, 15 to first sidewall A and second sidewall B of the cargo compartment K of truck T. Lower ends 14, 15 have a number of mounting holes 17 formed therein so that the height of the fore support above the cargo compartment can be adjusted. Aft support 10 is likewise an inverted U-shaped tubular member pivotally mounted to sidewalls A, B near the tailgate C of the truck. A central portion 16 of the aft support lies generally above the outer edge D of the tailgate when the tailgate is lowered.

Center support 12 is an inverted U-shaped tubular member pivotally mounted to the leg portions 18, 20 of the aft support. The central portion 22 of the center support lies centrally between central portion 16 of the aft support and central portion 24 of the fore support. A pair of chains 26 connecting aft support 10 and center support 12 keep the center support from pivoting downwardly. Other means for limiting the pivotal movement of support 12 may be used.

Leg portions 18, 20 also have a number of mounting holes 21 so the user can vary the height of the supports above floor E. Other means for adjusting the height of the fore and aft supports may also be used. For example, the supports may have telescoping leg members to allow adjustment of their length.

Cover 6 includes a generally rectangular top and four depending sides 32, 34, 36, and 38 to form a box-like covering. The top extends over the floor E of the cargo compartment and the lowered tailgate. Sides 32 and 36 extend from the top along parallel sides of the top to the upper portions of sidewalls A,B. Sides 32, 36 both typically have one or two screened windows 40. The windows typically include a flap (not shown) which can be rolled up from the inside. They may be secured by "Velcro" fasteners.

Side 34 extends between the top and the front sidewall F of the truck. Sides 32, 34 and 36 are typically attached along the upper edge of sidewalls A, B, and F by snaps G. Other fastening means, such as tie-down loops may also be used. Side 38 includes a pair of zippers 44 (only one shown) to allow the user to enter the interior of the tent camper. The lower edge of side 44 is fastened to outer edge D of the tailgate by snaps when so desired.

Frame 4 is kept in its upright, extended configuration through the interrelationship of the shape of the fabric cover and the force on the supports exerted by fore and aft straps 46, 48. A pair of fore straps 46 are attached to the central portion of the fore support and extend through slits in the cover. The outer ends 47 of fore straps 46 are hooked to a forward portion of the pickup truck T. In the disclosed embodiment, fore straps have hooks at outer ends which engage vent openings H in the hood of the truck. Aft straps 48 are connected to central portion 16 of aft support 10 and hook over the edge D of the lowered tailgate. The fore and aft straps pivotally bias the fore and aft supports away from one another. This biasing force is resisted by the shape of the cover to draw the top 30 of the cover tightly between the central portions of the fore and aft supports. Because the support straps are adjustable as to length and tension, stretching or shrinkage of the fabric of the cover is automatically compensated for by the straps. Since the height of the fore and aft supports can be changed, the sides of the cover can be kept taught as well. Thus the tent camper can maintain its neat, taut appearance regardless of dimensional changes in the fabric.

Although the use of the present invention should now be apparent, the procedure for erecting and collapsing the tent camper will be briefly described. Assuming that initially the fore and aft supports are mounted to the sidewalls of the truck, the cover is placed over the frame, and the frame is pivoted down within the cargo compartment, the tent camper is erected as follows. The user finds and grasps the fore straps, pivots the fore support upward and forward and hooks the end of the fore straps to openings H on the truck body. It may be necessary to partially erect the fore support and then rearrange the cover prior to fully erecting the fore support. When fully erected, central portion 24 lies generally above front sidewall F. The user then lowers the tailgate and unzips zippers 44. Aft straps 48 are grasped and the aft support and center support therewith are pivoted upward and rearward. The lower ends of the aft straps are hooked over edge D of the tailgate and the straps are tightened. The lower edges of the depending sides of the cover are snappd to the sidewalls of the cargo compartment. Final adjustments of the fore and aft straps are then made. The process is generally reversed when collapsing the tent camper.

The forward support may be pivotally mounted to front sidewall F rather than to first and second sidewalls A and B. If desired, no snaps G need be used only the upper edge of front sidewall F because of the protection afforded by cab J of the truck. Also, it is not essential to include center support 12. However, it is desirable to do so to reduce the sag in the top of the cover. Other modification and variation may be made to the preferred embodiment without departing from the invention.

What is claimed is:

1. A tent camper for mounting to the cargo compartment of a pickup truck, the cargo compartment having a generally rectangular floor, first and second generally parallel sidewalls, a front wall adjacent the cab of the pickup, and a rear tailgate opposite the front wall, said tailgate operable to a vertical, raised position and a horizontal, lowered position, said tent camper comprising:

a generally U-shaped fore support having a first central portion and a first pair of spaced apart free ends, said fore support pivotally attached at said first free ends to the cargo compartment near the cab;

a generally U-shaped aft support having a second central portion and a second pair of free ends, said aft support pivotally attached at said second free ends to the cargo compartment near the tailgate;

a cloth cover having a top and first, second, third and fourth sides depending from said top, said top shaped to generally overlie the floor and the tailgate when the tailgate is in the horizontal, lowered position, said sides sized to extend between said top and the first, second and front sidewalls and the lowered tailgate respectively when said first and second central positions are generally above said front sidewall and the upper edge of the lowered tailgate respectively and said top is supported thereby;

fore strap means for pivotally urging said fore support toward the cab;

aft strap means for pivotally biasing said aft support away from said cab so that said cover is stretched between said fore and aft supports;

means for removably fastening said first and second sides to the said first and second sidewalls respectively; and said fourth side of said cover including door means for entrance within the cargo compartment covered by said cover.

2. The tent camper of claim 1 wherein said fore support is pivotally attached to the first and second sidewalls near the front wall and said aft support is pivotally attached to the first and second sidewalls near the tailgate.

3. The tent camper of claim 1 further comprising a generally U-shaped center support having a third central portion and a third pair of spaced apart free ends, said center support mounted for limited pivotal movement to said aft support at said third free ends so that said third central portion lies generally between said first and second central portions of said fore and aft supports to support the top of said cover.

4. The tent camper of claim 1 wherein said fore strap means and said aft strap means attach directly to said fore and aft supports, respectively.

5. The tent camper of claim 1 wherein said aft strap means includes a hook for engagement with the tailgate when said tailgate is in the lowered position.

6. A tent camper for covering the cargo compartment of a pickup truck, said cargo compartment having first and second sidewalls, a front wall adjacent the cab, a tailgate opposite the front wall and a floor, the tailgate having a lower hinge edge and an outer edge opposing said hinge edge, comprising:
   a cloth cover comprising:
      a generally rectangular top sized to generally cover the floor and the tailgate when the tailgate is in a lowered, horizontal position,
      first, second, front and rear sides depending from said top to the first and second sidewalls, front wall and lowered tailgate respectively, and
      said rear side having door means for entering tent camper;
   means for attaching at least one of said first, second, front and rear sides of said cover to said respective first sidewall, second sidewall, front wall and lowered tailgate;
   a frame for supporting said cover over said cargo compartment having fore and aft inverted U-shaped supports, said fore and aft supports pivotally mounted to the cargo compartment near the cab and tailgate respectively;
   fore and aft strap means for pivotally urging said fore and aft supports away from the other thereby stretching said cover between said supports; and
   said aft strap urging means having means for removably engaging the outer edge of the lowered tailgate.

7. The tent camper of claim 6 wherein said attaching means includes means for removably attaching said first, second and rear sides of said cover to the first sidewall, second sidewall and the outer edge of the lowered tailgate respectively.

8. The tent camper of claim 7 wherein said fore and aft supports are each mounted to said first and second sidewalls.

9. A recreational tent camper vehicle comprising:
   a pickup truck, said truck including a cab mounted forward of a cargo compartment;
   said cargo compartment including a floor, two parallel sidewalls, a front wall and a tailgate, the tailgate movable between an upright, closed position and a lowered, open position, the tailgate having a lower, hinge edge and an upper, outer edge;
   a cloth cover having a top extending over the cargo compartment and the lowered tailgate and having a plurality of sides depending from the top;
   an opening in at least one of said sides to provide access to the cargo compartment;
   a frame means pivotally mounted to the sidewalls for supporting the cover above the cargo compartment, the frame means including a fore support having a fore upper edge disposed generally above the front wall and an aft support having an aft upper edge disposed generally above the outer edge of the lowered tailgate;
   a fore strap means coupled to said fore support for biasing said fore support toward said cab and away from said aft support;
   an aft strap means coupled to said aft support for biasing said aft support away from said fore support; and
   means for releasably securing said sides to at least said sidewalls.

10. The tent camper of claim 9 further comprising window means in said sides.

* * * * *